United States [11] 3,609,518

[72] Inventor John H. Baker
 Houston, Tex.
[21] Appl. No. 765,563
[22] Filed Oct. 7, 1968
[45] Patented Sept. 28, 1971
[73] Assignee Schlumberger Technology Corporation
 New York, N.Y.

[54] LOGARITHMIC METHODS AND APPARATUS FOR PROCESSING WELL LOGGING SIGNALS
 11 Claims, 4 Drawing Figs.
[52] U.S. Cl. .................................................... 324/1,
 324/6, 324/10
[51] Int. Cl. .................................................. G01v 3/18
[50] Field of Search ........................................ 324/1, 6,
 10, 132; 328/145; 235/194–197; 307/229, 230;
 340/18

[56] References Cited
 UNITED STATES PATENTS

| | | | |
|---|---|---|---|
| 3,076,955 | 2/1963 | Huddleston | 235/196 X |
| 3,166,720 | 1/1965 | Rosen et al. | 330/110 |
| 3,180,141 | 4/1965 | Alger | 324/1 X |
| 3,181,056 | 4/1965 | Boissonnas | 324/1 |
| 3,226,633 | 12/1965 | Schneider | 324/1 X |
| 3,267,377 | 8/1966 | Mandoli et al. | 328/145 X |
| 3,374,361 | 3/1968 | Callis | 328/145 X |
| 3,440,414 | 4/1969 | Miller | 328/145 X |
| 3,449,672 | 6/1969 | Thomas | 324/132 X |
| 3,453,530 | 7/1969 | Attali | 324/1 |

Primary Examiner—Gerard R. Strecker
Attorneys—Donald H. Fidler, William R. Sherman, Edward M. Rodney, William J. Beard, Stewart F. Moore, Jerry M. Presson and Leonard R. Fellen ABSTRACT: In accordance with an illustrative embodiment of the present invention, logging measurements of radially shallow conductivity from an electrode logging tool, radially deep and medium conductivity from an induction logging tool, acoustic travel time from a sonic logging tool, as well as natural gamma-ray and spontaneous potential measurements are processed for recording as a function of borehole depth. More specifically, the shallow conductivity measurement signals are averaged and applied to a hybrid logarithmic circuit which operates to form a logarithm function thereof until the signal amplitude reaches a predetermined level at which time a linear function of the measurement signals is formed. The output signals from the hybrid logarithmic circuit are recorded with three separate degrees of resolution using only two galvanometers by multiplexing two signals on one galvanometer. A speedup circuit is utilized to prevent the galvanometer retrace from appearing on the recording medium. The induction logging signals are processed by suitable computing circuits to sharpen their resolution and then applied to hybrid logarithmic and skin effect circuits which, in addition to forming the logarithmic and linear functions, provides a skin effect correction. The resulting processed induction logging measurements are recorded with differing degrees of resolution and the radially deep measurement signals are combined with acoustic travel time derived porosity measurements to produce indications of the resistivity of the formation fluids.

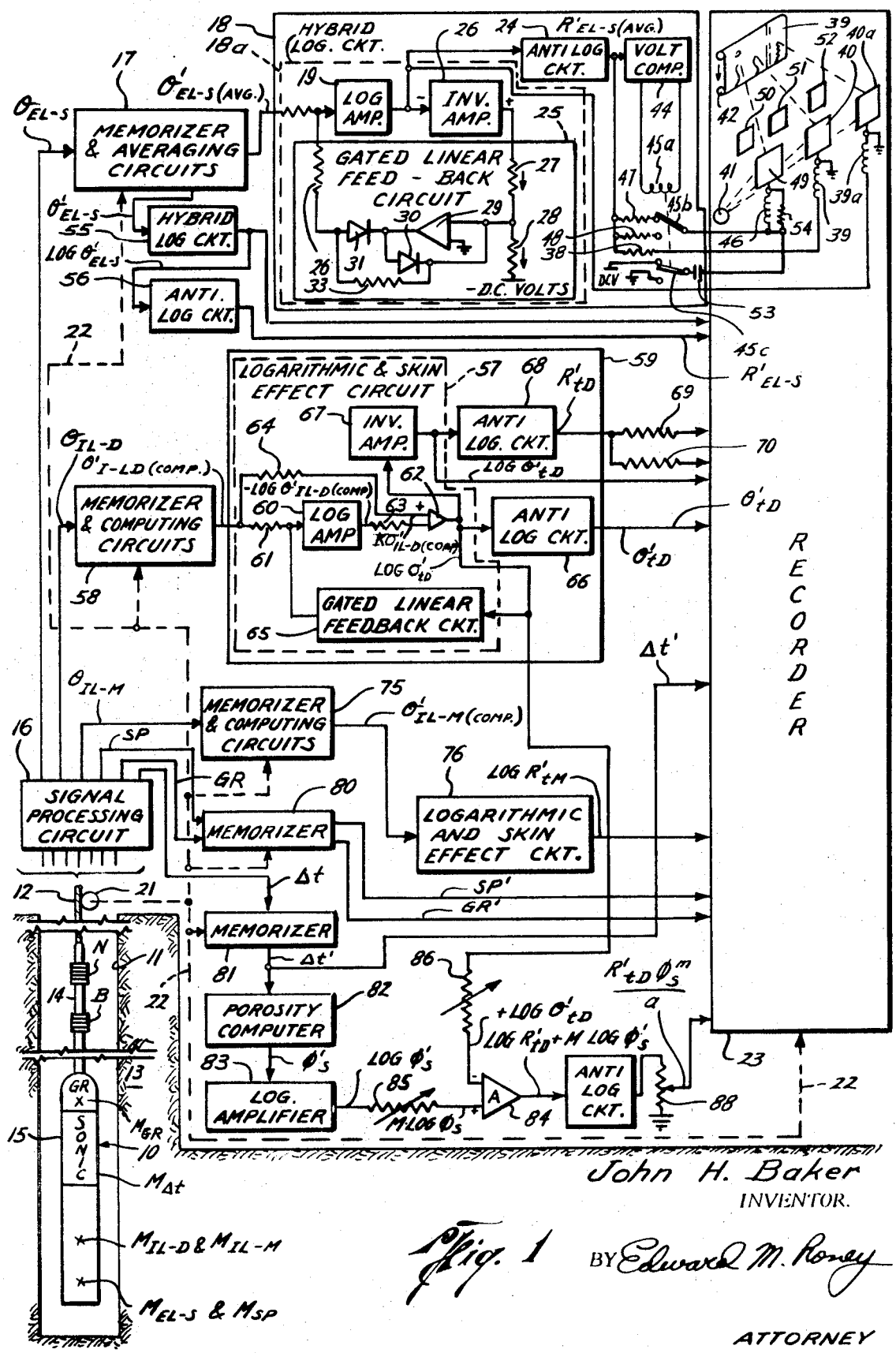

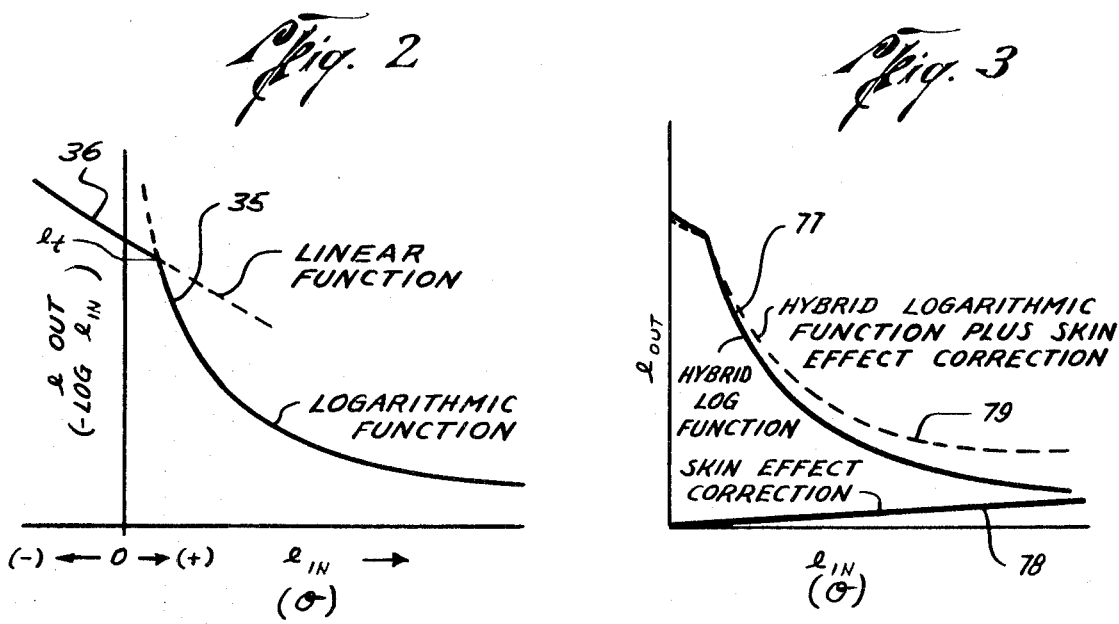
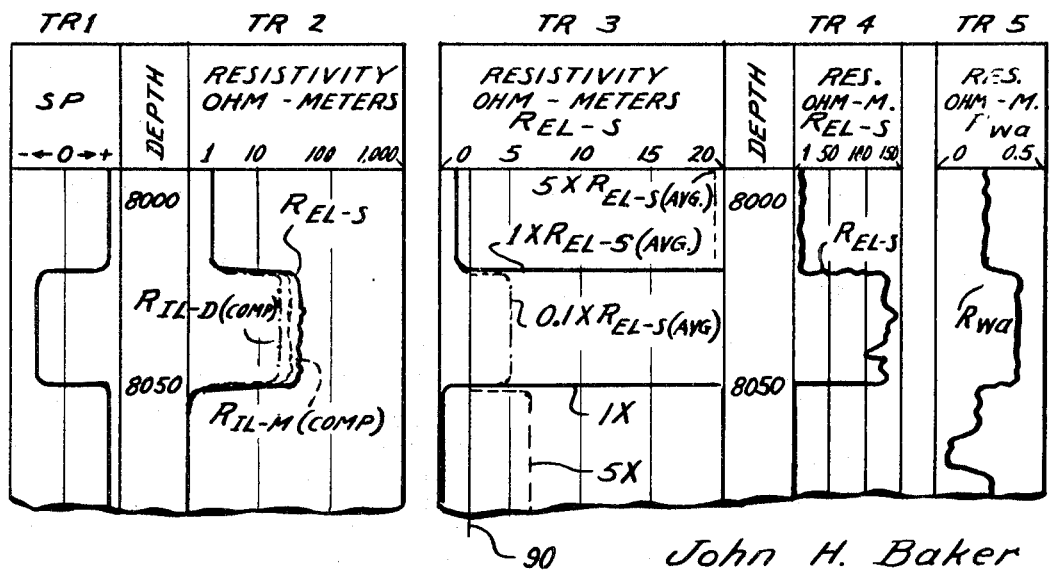

LOGARITHMIC METHODS AND APPARATUS FOR PROCESSING WELL LOGGING SIGNALS

This invention relates to methods and apparatus for processing well logging signals derived from exploring devices which are passed through a borehole for investigating earth formations adjacent to the borehole.

In the investigation of earth formations adjacent a borehole, various types of investigating devices are utilized for deriving information as to various formation characteristics and producing a log of such information versus borehole depth. Among these devices are the so-called resistivity or conductivity devices which, as their names imply, measure the resistivity or its reciprocal, conductivity, of earth formations. One way to produce such resistivity or conductivity measurements is to utilize either induction or coil-type exploring devices wherein a transmitter inductively couples current into a formation, the magnitude of this current being sensed by a nearby receiver to provide a measure of formation conductivity. Another form of resistivity or conductivity exploring devices utilize electrodes for directly emitting current into a formation to obtain a measure of its resistivity or conductivity. By appropriately arranging the electrodes and coils of these exploring devices, the depth of investigation can be controlled.

An example of such resistivity or conductivity measuring devices having different depths of investigation can be found in copending application Ser. No. 709,838 by Georges Attali, filed on Mar. 1, 1968 which is a continuation of application Ser. No. 240,568, filed on Nov. 28, 1962. In this copending Attali application, an electrode array having a relatively shallow depth of investigation is combined with two induction coil arrays which have medium and deep depth of investigation. As set forth in the Attali application, the induction logging signals are desirably corrected for the so-called "skin effect" phenomenon to produce more accurate measurements. By producing logs derived from exploring devices having different depths of investigation, the depth of invasion of the drilling mud contained in the borehole into the formation can be readily determined since the resistivity of the drilling mud is generally different from the resistivity of the connate formation fluids.

As stated in this copending Attali application, it is desirable to record these conductivity or resistivity well logging signals in logarithmic form. Among the advantages of such a logarithmic presentation is that measurements having a large dynamic range can be recorded on one film or track, yet good resolution is attainable in the measurement ranges of most interest. Another advantage of such a logarithmic presentation is that multiplication or division ky a constant can readily be achieved by merely sliding one curve relative to another, as by an overlay technique.

Although a logarithmic function is essentially a compressed scale function, i.e., the resolution at high signal levels is less than the resolution at low signal levels, it has been found that the range of amplitudes of well logging signals is sometimes so great that even with logarithmic recording of such well logging signals on standard size films, the recorded traces will sometimes go off scale due to the large dynamic range of most well logging measurements. As can be expected, a log analyst may become disturbed when there are no recorded results on large portions of a log. For one thing, there may be a suspicion that the investigating equipment has broken down.

It is therefore one object of the present invention to solve the foregoing problem and still provide a logarithmic presentation of well logging data.

Although a logarithmic presentation may be the most preferred form of presentation, it has been found that there are some log analyst who may prefer a linear presentation. The reason for this is to provide a log which can be readily correlated with other linearly presented logs which may have been previously run. However, when recording logs in a linear form, the problem of resolution versus dynamic range presents itself again. One known way of solving this problem is to record several curves of the same data but using different scales, i.e., different resolutions. However, when recording one well logging signal on several different linear scales, it can be seen that a large number of galvanometers will be required. Thus, the number of required galvanometers may well exceed the number of available galvanometers.

It is therefore a further object of the present invention to provide new methods and apparatus for solving the foregoing problem without requiring a great many galvanometers.

It is many times the case that certain well logging signals are to be recorded in a form different from that in which they were measured. Thus, well logging signals proportional to the conductivity of earth formations are often recorded as resistivity signals. In the past, this has necessitated the use of reciprocators to convert a conductivity signal to a resistivity signal. As is well known in the art, it is very difficult to design a simple and inexpensive reciprocator which is at the same time reasonably accurate.

It is therefore an additional object of the present invention to provide new and improved methods and apparatus for solving the foregoing problem without using these reciprocators.

Generally, it is an object of the present invention to provide new and improved methods and apparatus for processing well logging signals.

In accordance with one form of the present invention, methods and apparatus for processing well logging signals comprises utilizing a converting means for converting an input well logging signal to an output signal which varies substantially as a logarithmic function of the input well logging signal. The output signal can then be monitored to enable the converting means to change from a logarithmic transfer function to a linear transfer function upon the output signal attaining a given threshold level. Also, the logarithmic output signal from the converting means can be inverted in polarity and applied to an antilog circuit to produce a linear inverse function of the input well logging signal, thus avoiding the necessity of using more complicated types of reciprocators.

If the well logging signals are derived from the so-called "induction logging" type of exploring device, skin effect correction can be implemented by adding a predetermined fraction of the input well logging signal to the logarithmic function signal. Moreover, all of the above-discussed operations can be carried out simultaneously.

In accordance with another form of the present invention, a well logging signal having a large dynamic range can be linearly recorded by utilizing a plurality of scale ranges, or resolutions, i.e., recording the same signal multiplied by a plurality of different gain factors. To economize on the number of required galvanometers, at least two signals having different resolutions can be multiplexed. To this end, the amplitude of the signal to be recorded can be monitored to enable the selection of the desired resolution. So that the galvanometer will not produce a visible trace when switching between the differing resolution signals, a large amplitude signal can be supplied to the galvanometer at the time of switching to speed up the retrace velocity, i.e., the velocity with which the galvanometer trace moves across the record medium from one position to another.

For a better understanding of the present invention, together with other and further objects thereof, reference is had to the following description taken in connection with the accompanying drawings, the scope of the invention being pointed out in the appended claims.

Referring to the drawings:

FIG. 1 shows an investigating apparatus having multiple exploring devices in a borehole along with a schematic representation of a system for processing the well logging signals derived from such apparatus in accordance with the present invention;

FIGS. 2 and 3 show the transfer characteristics of various portions of the circuitry of FIG. 1; and FIG. 4 shows a typical example of logs that could be expected from the FIG. 1 system.

Now referring to FIG. 1, there is shown an investigating apparatus 10 lowered in a borehole 11 on the end of an armored multiconductor cable 12 for investigating earth formations 13. The lower 100 feet or so of the cable 12 is covered with a suitable insulating material 14 and also has a pair of electrodes B and N mounted thereon. The investigating apparatus 10 includes deep and medium investigation induction logging devices, a shallow investigation electrode device, a spontaneous potential measuring device, an acoustic travel time measuring device and a natural gamma-ray measuring device. The induction and electrode logging exploring devices as well as the spontaneous potential exploring device are shown in detail in the copending Attali application Ser. No. 709,838. An example of a sonic exploring device can be found in U.S. Pat. No. 3,231,041 granted to F. P. Kokesh on Jan. 25, 1966. The measure points of each of the exploring devices are represented by X's on the investigating apparatus 15 with the gamma-ray measure point $M_{GR}$ being the highest measure point. The lowest measure point is the measure point for the shallow electrical log and spontaneous potential, designated respectively $M_{EL-S}$ and $M_{SP}$. The medium and deep induction log measure points and the sonic measure point, designated $M_{IL-M}$, $M_{IL-D}$, and $\underline{M_{\Delta t}}$ respectively, are intermediate of the gamma-ray and shallow electrical log measurements.

The signals derived from each of the exploring devices are transmitted by way of various conductors within the armored multiconductor cable 12 to suitable signal processing circuits 16 at the surface of the earth. These signal processing circuits 16 perform various signal processing functions such as referencing the various signals to ground, gain control, and, in general preparing the signals for application to the various circuits at the surface of the earth.

Considering first the conductivity signal $\sigma_{EL-S}$ derived from the shallow electrical logging device, this signal is applied to suitable memorizer and averaging circuits 17. These circuits act to memorize the conductivity signal over a given depth interval and readout certain ones of the memorized signals to an averaging circuit. This operation tends to decrease the resolution of the shallow electrical log measurement so as to be matched with the induction logging measurements. The memorizer portion of circuit 17 is driven as a function of borehole depth by a shaft 22 coupled to a wheel 21 which engages the cable 14. The memorizer and averaging circuits 17 then generate an averaged conductivity signal $\sigma'_{EL-S(avg)}$ and a second unaveraged signal $\sigma'_{EL-S}$. The prime designations on all of the signals of FIG. 1 indicate that these signals are all referenced to the same depth level. Thus, the reading out of the signals for the memorizer portion of circuits 17 is selected such that two output signals therefrom will both be at the same depth level. The memorizer and averaging circuits 17 are shown in greater detail in copending application Ser. No. 749,158 by H. G. Doll, filed on July 31, 1968.

Considering first the averaged signals $\sigma'_{EL-S(avg)}$, this signal is supplied to a processing circuit 18. Considering the processing circuit 18 in greater detail, the $\sigma'_{EL-S(avg)}$ signal is fed to a logarithmic amplifier 19 via a suitable input resistor 20. The logarithmic amplifier 19 could, for example, take the form of the logarithmic circuit shown in the copending Attali application Ser. No. 709,838 or, for that matter, any form of logarithmic amplifier. The output signal from the logarithmic amplifier 19 is thus an inverted logarithmic function of the applied input signal, i.e., $-\log \sigma'_{EL-S(avg)}$. This logarithmic signal is then applied to a galvanometer-type recorder 23 whose record medium is driven as a function of depth by the shaft 22 and to an antilog circuit 24 for further processing (to be discussed later). Inside the recorder 23, this signal is used to energize a solenoid 39a for causing a galvanometer mirror 40a to assume an angular position representative of the current through solenoid 39a. A light source 41 emits a beam of light which is reflected off of the mirror onto track B of a record medium 34. The record medium 34 is driven by the shaft 22 as a function of depth to thereby make a log of $-\log \sigma'_{EL-S(avg)}$.

As discussed earlier, one of the advantages of converting well logging signals having a large dynamic range to logarithmic functions thereof is that the scale becomes automatically compressed and good resolution is maintained throughout the lower ranges of primary interest. However, as discussed earlier, even when utilizing such a logarithmic presentation, it is not entirely uncommon for the measurements to go off scale. To circumvent this, a gated linear feedback circuit 25 detects when the output signal from the logarithmic amplifier 19 exceeds a predetermined threshold level, which level is near the edge of the recording scale, i.e., nearly off scale, and causes a negative feedback action through a resistor 26 such that the output signal from the logarithmic amplifier 19 will vary in a relatively low resolution linear manner after this threshold level has been attained.

More specifically, the negative output signal from logarithmic amplifier 19 (i.e., negative if $\sigma'_{EL-S(avg)}$ is positive) is inverted in polarity by an amplifier 26. The positive output signal from amplifier 26 is then compared with a negative reference voltage by way of a pair of resistors 27 and 28 and the difference therebetween applied to the input of an operational amplifier 29. When the current through resistor 27 from the amplifier 26 is less than the current through resistor 28 from the negative reference voltage source, the output of the operational amplifier 29 will be positive thus causing the output current from amplifier 29 to be fed back to its input by way of a diode 30. A resistor 26 is connected to the anode of a diode 31 whose cathode is connected to the output of amplifier 29 such that when the amplifier 29 output is positive, the diode 31 will be back-biased thus preventing current flow through the resistor 26.

Now, when the current through resistor 27 exceeds the current through resistor 28, the output of the amplifier 29 will become negative thus allowing current to flow through the resistor 26 and a resistor 33 which is connected from the input of amplifier 29 to the anode of diode 31. The feedback current then acts to maintain the input of logarithmic amplifier 19 and thus the output thereof at a substantially constant value. How constant this value remains depends on the ratio of the values of resistors 27 and 33. Thus, by appropriately selecting the values of these two resistors, the overall closed loop gain of the system can be set at a desired level so that the output of logarithmic amplifier 19 will change linearly with the applied input signal $\sigma'_{EL-S(avg)}$. This entire circuit just described makes up a hybrid logarithmic circuit, represented by the dashed line box 18a.

Referring to FIG. 2, there is shown the transfer curve of the circuit just described. The input voltage $e_{in}$ (output voltage from circuits 17) is shown on the horizontal axis and the output voltage $e_{out}$ from logarithmic amplifier 19 is shown on the vertical axis. The curve 35 represents the logarithmic transfer function produced by the logarithmic amplifier 19. It can be seen from the curve 35 of FIG. 2 that the output voltage will become exceedingly high for very small values of input voltage, i.e., conductivity. Thus, if $\sigma'_{EL-S(avg)}$ becomes low enough, the log being traced on the record medium would go off scale. After the output voltage $e_{out}$ reaches the threshold level, designated $e_t$ in FIG. 2, the transfer function changes to the linear function represented by the line 36. Thus the overall circuit transfer function is represented by the solid line portion of lines 35 and 36 in FIG. 2.

It should be noted from FIG. 2 that negative conductivity signals can be readily recorded when using this linear transfer function, which would not be possible with just the logarithmic transfer function. (Even though it is theoretically impossible to have negative conductivity signals, it nonetheless happens from time to time that negative conductivity signals are produced by the downhole exploring device for one reason or another and it is advantageous for the well log analyst to be able to determine at a glance that negative measurements are being made.)

It is to be understood that the slope of the line 36 as well as the threshold level $e_t$ can be set at any given value beside the ones depicted in FIG. 2. Thus, it would be possible, if desired, to lower the threshold level $e_t$ from the point shown in FIG. 2 and adjust the slope of line 36 such that the transition from logarithmic to linear transfer functions will be relatively smooth.

As stated earlier, it is many times desirable to convert a measured conductivity signal to a resistivity signal. Prior to this time, such an operation would require a more complicated reciprocator. However, by utilizing the apparatus of the present invention, this reciprocating operation can be performed in a relatively simple and accurate manner by taking the antilog of a negative logarithmic signal. Thus, in FIG. 1, the output signal from logarithmic amplifier 19, which is proportional to $-\log \sigma'_{EL\text{-}S(avg)}$, is applied to the antilog circuit 24 which produces a linear resistivity signal, designated $R'_{EL\text{-}S(avg)}$. This resistivity signal is then supplied to the recorder 23 by way of a resistor 38 whose value is appropriately selected to produce a scale multiplication factor of 1.

Inside the recorder 23, the current through resistor 38 is supplied to a galvanometer winding 39 for causing a rotatable mirror 40 to assume an angular position representative of the magnitude of the current through coil 39. The light source 41 emits a light beam which is reflected off of the mirror 40 onto the recording medium (e.g., film) 42 to thereby make a log of $R'_{EL\text{-}S(avg)} \times 1$ on track A of the record medium 42.

As discussed earlier, when recording well logging signals in a linear fashion, the large dynamic range of most well logging signals may well require more than one recording of the same measurement, but using different scales. In fact, to achieve reasonably good resolution at all amplitude levels of the shallow resistivity measurement $R'_{EL\text{-}S(avg)}$, it has been found that three logs having different scales should be recorded. Normally, this would require three separate galvanometers. However, in the FIG. 1 system, three logs are recorded with only two galvanometers. To accomplish this, the output signal from the antilog circuit 24 is supplied to a suitable voltage comparator 44 which energizes a relay solenoid 45. In the normally closed position of the relay switch 45b, the resistivity signal $R'_{EL\text{-}S(avg)}$ is supplied to a galvanometer coil 46 by way of a resistor 47. The value of the resistor 47 is selected such as to provide a multiplication factor 5. When the resistivity signal $R'_{EL\text{-}S(avg)}$ exceeds the threshold level of voltage comparator 44, the relay switch 45b switches to its normally open position so as to connect another resistor 48 to the galvanometer coil 46. The resistance value of resistor 48 is selected such as to multiply the resistivity signal by a factor of 0.1. To prevent the comparator 44 from continuously changing states when $R'_{EL\text{-}S(avg)}$ is at or near the threshold level, some hysteresis is built into the comparator so that the threshold level going up (increasing voltage) is different from the level coming down (decreasing voltage).

The galvanometer coil 46 causes a galvanometer mirror 49 to reflect a beam of light from the light source 41 onto the record medium 42 on the same track that the $R'_{EL\text{-}S(avg)} \times 1$ log is being recorded. By this means, one of the $R'_{EL\text{-}S(avg)} \times 0.1$ or $R'_{EL\text{-}S(avg)} \times 5$ signals will be recorded, depending on the value of $R'_{EL\text{-}S(avg)}$, through the use of only one galvanometer. Thus, a linear presentation of a measurement having a large dynamic range can be made while at the same time maintaining a good degree of resolution over the entire dynamic range of the measurement.

Whenever the relay 45 switches, the galvanometer mirror 49 will have to retrace, i.e., move from one end of the record medium to the other. Unless this movement is very fast, the retrace will undesirably shown up on the record medium as part of the log. To prevent this from happening, the relay solenoid 45a causes another relay switch 45c to switch back and forth between ground and a positive DC voltage each time the comparator 44 output changes state. The resulting square wave is differentiated by a capacitor 53 and resistor 54 to produce a sharp positive or negative pulse to speed up the mirror 49 movement. The connections of relay switches 45b and 45c are made such that a positive pulse will be produced whenever the relay switch 45b switches from the 5x scale to the 0.1x scale and a negative pulse will be produced for the opposite case.

Due to the rapid movement of the galvanometer mirror 49, it will swing rapidly to an extreme angular position and then return exponentially to the correct measurement value. This would tend to produce an undesirable overshoot on the record medium. To prevent this overshoot from showing up on the record medium 34, a pair of opaque optical masks 50 and 51 are located between the galvanometer mirror 49 and the record medium 34. The mask 50 is positioned such as to intercept the light beam whenever it would impinge on the record medium at a point lower than 10 percent of full scale. The mask 51 prevents the mirror 49 light beam from going beyond the edge of the record medium on the full scale side thereof and the mirror 40 light beam from going below 10 percent of full scale deflection. Additionally, a third optically opaque mask 52 is positioned such as to intercept light from the galvanometer mirror 40 whenever this beam of light would go beyond full scale deflection on the record track A. The stops 51 and 52 prevent the traces being recorded on track A from interfering with the logarithmic curve being recorded on track B. Suitable stop means (not shown) are arranged relative to the galvanometer mirrors 40 and 49 to prevent the reflected light from these mirrors from going beyond the dimensions of the opaque masks.

Along with recording the averaged values of resistivity derived from the shallow investigation device, it would also be beneficial to record an unaveraged shallow investigation resistivity measurement to enable the detection of thin formation beds, such as the highly resistive lignite beds commonly found in the Gulf Coast. To this end, the unaveraged conductivity signal $\sigma'_{EL\text{-}S}$ from the memorizer and averaging circuits 17 is applied to another hybrid logarithmic circuit 55, which is the same in construction as the above-discussed hybrid logarithmic circuit 18a. The output signal from this circuit 55 is thus proportional to $-\log \sigma'_{EL\text{-}S}$ and is supplied to the recorder 23 for recordation as a function of depth. Additionally, the output signal from the hybrid logarithmic circuit 55 is applied to an antilog circuit 56 which supplies a signal proportional to $R'_{EL\text{-}S}$ to the recorder 23. (For brevity of the drawings only the three galvanometers already discussed will be shown in FIG. 1.)

The deep induction log conductivity signal $\sigma_{IL\text{-}D}$ from the signal processing circuits 16 is applied to a memorizer and computing circuit 58 which operates to store the induction logging signals over a given depth interval (through the action of shaft 22) for subsequent readout to a computing circuit to produce a signal $\sigma'_{IL\text{-}D(comp)}$ having better vertical (depthwise) resolution than the raw input signal. Apparatus for performing this function can be found in U.S. Pat. No. 3,166,709 granted to H. G. Doll on Jan. 19, 1965. This computed output signal is supplied to a signal processing circuit 59 which operates to convert the computed signal to a hybrid logarithmic function of the original input signal in the same manner that the shallow investigation conductivity signal $\sigma'_{EL\text{-}S(avg)}$ was converted by the hybrid logarithmic circuit 18a. The processing circuit 59 additionally corrects the induction log derived conductivity signal for so-called "skin effect." As is well known in the well logging field, the resistivity or conductivity values derived from an induction logging type exploring device will tend to have an error component due to skin effect at high conductivity values. It has been found that the true formation conductivity $\sigma_t$, as measured by an induction logging device, can be expressed in terms of the apparent or measured value of conductivity $\sigma_a$ as:

$$\log \sigma'_t = \log n \, \sigma'_a + K \, n \cdot \sigma_a' + \epsilon \qquad (1)$$

where K and n are constants representative of the coil geometry and operating frequency and $\epsilon$ is an error term. (Desirably, n is adjusted during calibration to make $\epsilon$ as small as possible.)

To bring about these results, the computed conductivity signal $\sigma'_{IL-D(comp)}$ from circuit 58 is applied to a logarithmic and skin effect circuit 57. Inside the circuit 57, this signal is supplied to a logarithmic amplifier 60 by way of an input resistor 61. This signal is, in effect, a computed version of the apparent deep conductivity. The output signal from the logarithmic amplifier 60 is thus proportional to $-\log \sigma'_{IL-D(comp)}$ and is fed to the negative or polarity inverting input of an operational amplifier 62 by way of a coupling resistor 63. The computed conductivity signal $\sigma'_{IL-D(comp)}$ is supplied to the positive input of the operational amplifier 62 by way of a resistor 64. Thus, the output from operational amplifier 62 will be proportional to $\log \sigma'_{IL-D(comp)} + K \sigma'_{IL-D(comp)}$. The values of resistors 63 and 64 are selected to provide the constant K of equation (1).

A gated linear feedback circuit 65 then monitors the output of the operational amplifier 62 in the same manner and for the same reasons as the gated linear feedback circuit 25 did in the hybrid logarithmic circuit 18a. This output signal from operational amplifier 62 is thus proportional to the logarithm of the true conductivity $\sigma'_{tD}$ as measured by the deep investigation induction logging device, i.e., $\log \sigma'_{tD}$.

If desired, the conductivity signal derived from the deep investigation induction logging device can also be recorded in linear form. To this end, $\log \sigma'_{tD}$ can be supplied to an antilog circuit 66 which produces an output signal proportional to the true deep conductivity $\sigma'_{tD}$ which can be recorded by recorder 23 if desired. The output signal from operational amplifier 22 can also be inverted by an inverting amplifier 67 for application to an antilog circuit 68. The output signal from the antilog circuit 68 will thus be proportional to the true deep resistivity $R'_{tD}$. Since this signal is in linear form, it is desirably recorded on one track with several different resolutions (in this case two separate scales or gain factors are used as determined by a pair of resistors 69 and 70.)

Referring now to FIG. 3, there is shown a plot of the transfer characteristics of the logarithmic and skin effect circuit 57. The input voltage $e_{in}$ to circuit 57 is represented on the horizontal axis and the output voltage $e_{out}$ therefrom is represented on the vertical axis. The hybrid logarithmic transfer function is represented by the solid line curve 77 and is essentially the same as the solid line curve in FIG. 2. The skin effect correction is represented by the solid line curve 78 and the combination of the hybrid logarithmic function curve and the skin effect correction curve is represented by the dashed line curve 79. Thus, the dashed line curve 79 corresponds to the overall transfer function of the logarithmic and skin effect circuit 57.

The apparent conductivity signal derived from the medium investigation induction logging device is supplied to memorizer and computing circuits 75 which operate to perform essentially the same functions as the memorizer and computing circuits 58 for the deep investigation induction logging signal. The output signal from the memorizer and computing circuits 75 is thus a computed version of the apparent medium investigation conductivity signal, designated $\sigma'_{IL-M(comp)}$. This signal is applied to a logarithmic and skin effect circuit 76 which is arranged in a similar manner to the earlier discussed logarithmic and skin effect circuit 57 except that the constants would be somewhat different. The output signal from the logarithmic and skin effect circuit 76 is thus proportional to the logarithm of the true medium investigation resistivity and is designated $\log R'_{tm}$. This logarithmic signal is then recorded by recorder 23 as a function of borehole depth.

The spontaneous potential and natural gamma-ray measurements from signal processing circuits 16 are supplied to a memorizer 80 which is also driven as a function of borehole depth by the shaft 22. The memorized SP and gamma-ray measurements, designated SP' and GR' respectively, are then supplied to the recorder 23 for recording as a function of depth. These SP' and GR' measurements can be utilized to indicate shale formation beds, as well as for depth control purposes, i.e., the SP or GR measurements can be correlated with an SP or GR measurement taken during a different run in the borehole.

The sonic $\Delta t$ measurement from the signal processing circuits 16 is supplied to a memorizer 81 which is also driven by the shaft 22. The depth correlated $\Delta t'$ measurement from memorizer 81, designated $\Delta t'$ is supplied to a porosity computer 82 which computes the sonic derived porosity $\Phi_s$ in accordance with Wyllie's time average formula in a manner well known in the art. This porosity signal is supplied to a logarithmic amplifier 83 which produces an output signal proportional to the logarithm of the sonic derived porosity, i.e., $\log \Phi'_s$.

As set forth in U.S. Pat. No. 3,180,141 granted to R. P. Alger on Apr. 27, 1965, a combination of a sonic derived porosity measurement with a true formation resistivity $R_t$ measurement obtained from a relatively deep investigation exploring device will give the apparent water resistivity $R_{wa}$ in accordance with the expression:

$$R_{wa} = \frac{R_t \phi^m}{a} \quad (2)$$

where $a$ and $m$ are exponents dependent upon the rock structure. ($m=z$ may be used for most formations, $a=0.81$ may be used for most rock structure, and $a=1.0$ for most carbonates.) As set forth in this Alger patent, a log of the apparent water resistivity $R_{wa}$ is beneficial in indicating various formation conditions.

Referring back to FIG. 1, to solve equation (2), the output from logarithmic amplifier 83 is supplied to the noninverting input of an operational amplifier 84 by way of a variable resistor 85. Additionally, the output signal from the operational amplifier 62 of the processing circuits 59 supplies a signal proportional to $\log \sigma'_{tD}$ to the inverting input of the operational amplifier 84 by way of a resistor 86. The output signal from operational amplifier is thus proportional to $\log R'_{tD} + m \log \Phi'_s$ where $m$ is determined by the value of resistor 85. This output signal from operational amplifier 84 is then supplied to an antilog circuit 87 which converts the logarithmic signals to a linear signal proportional to $R'_{tD} \cdot \Phi'^m_s$. The multiplying factor $a$ of equation (2) is produced by a suitable potentiometer 88 on the output of the antilog circuit 87 so as to produce a signal in accordance with equation (2) for recording by recorder 23 as a function of borehole depth.

Now referring to FIG. 4, there is shown a typical example of some of the recorded logs that can be produced by the apparatus of FIG. 1. The spontaneous potential is recorded in track 1 and the logarithmic deep, medium, and shallow investigation resistivity signals are recorded in track 2. As set forth in the copending Attali application, these logs in tracks 1 and 2 can be utilized in the determination of various formation conditions, such as water and hydrocarbon saturation. The averaged shallow investigation measurements are also recorded in linear form on track 3. As stated earlier, such a linear presentation enables easy correlation of these logs with earlier derived linear-type logs. The solid line curve in track 3 represents the 1x scale and the dotted line curve represents the 5x scale. The dash-dot line curve represents the 0.1x scale.

In track 3, it can be seen that at least one of the 1x, 0.1x, or 5x curves will be traced on the recording medium all of the time. It can also be seen that the 0.1x and 5x curves are blanked out on the lower 10 percent of the scale to prevent the galvanometer overshoot from showing up, this 10 percent line being designated 90 in FIG. 4. When the resistivity values are relative low, the 5x curve is the most informative or useful curve and when the resistivity values are very high, the 0.1x curve is the most beneficial curve. Thus, with the presentation depicted in track 3 of FIG. 4, a linear resistivity presentation can be made, and yet a high degree of resolution can be maintained for substantially all resistivity values. Moreover, the three curve presentation of track 3 has been made with the use of only two galvanometers and without unsightly traces arising out of the galvanometer switching operation.

The unaveraged shallow resistivity log is shown recorded in track 4. As can be seen by comparing the averaged curves of track 3 and the logarithmic unaveraged $R_{EL-S}$ curve of track 2 with the track 4 unaveraged curve, this track 4 curve has much greater detail and can thus be used to readily spot thin formation beds having different resistivities than the surrounding formations.

The apparent water resistivity $R_{wa}$ is shown recorded in track 5 and can be utilized in conjunction with the curves recorded in tracks 1 and 2 to provide a great amount of information as to various formation conditions, as for example, distinguishing between water and hydrocarbon formation zones.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for processing well logging signals derived from an exploring means in a borehole, comprising:
   input means adapted to receive a well logging signal;
   converting means, including an amplifier with a logarithmic element in the feedback path of said amplifier, for converting said well logging signal to an output signal which varies substantially as a logarithmic function of said well logging signal; and
   means responsive to said output signal attaining a given threshold level for switching a resistor into a feedback path of said amplifier to change the transfer function of said converting means to a low resolution linear function for all values of said well logging signal in excess of a high value determined by said threshold level.

2. Apparatus for processing well logging signals derived from an exploring means in a borehole, comprising:
   input means adapted to receive a well logging signal representative of the conductivity of an earth formation adjacent a borehole;
   converting means, including an amplifier with a logarithmic element in the feedback path of said amplifier, for converting said well logging signal to an output signal which varies substantially as the logarithm of the resistivity of a formation; and
   means responsive to said output signal attaining a given high amplitude threshold level for switching a resistor into a feedback path of said amplifier to change the transfer function of said converting means to a low resolution linear function of the resistivity of a formation for all resistivity values in excess of a given high resistivity determined by said threshold level.

3. Apparatus for processing well logging signals derived from an exploring means in a borehole, comprising:
   input means adapted to receive a well logging signal;
   converting means, including an amplifier with a logarithmic element in the feedback path of said amplifier, for converting said well logging signal to an output signal which varies substantially as a negative logarithmic function of said well logging signal;
   means responsive to said output signal attaining a given threshold level for switching a resistor into a feedback path of said amplifier to change the transfer function of said converting means to a linear function; and
   antilogarithmic conversion means for converting said output signal to a second output signal representative of an inverse function of said well logging signal over the logarithmic operating range of said converting means whereby said output signals may both be recorded to produce indications of the logarithm of an inverse function and an inverse function of said well logging signal.

4. Apparatus for processing well logging signals derived from an exploring means in a borehole, comprising:
   input means adapted to receive a well logging signal;
   means for converting said well logging signal to a logarithmic signal which varies substantially as a logarithmic function of said well logging signal; and
   means coupled to said input means for adding a predetermined fraction of said well logging signal to said logarithmic signal to produce an output signal which is representative of a given characteristic of an earth formation.

5. Apparatus for processing well logging signals derived from an induction logging type of exploring means in a borehole, comprising:
   input means adapted to receive a well logging signal $\sigma_a$ representative of the conductivity of an earth formation adjacent a borehole;
   means for converting said well logging signal to a logarithmic signal which varies substantially as a logarithmic function of said well logging signal; and
   means coupled to said input means for adding a predetermined fraction of said well logging signal to said logarithmic signal in accordance with the relationship $\sigma_t = \log \sigma_a + K\sigma_a$ to produce an output signal which is representative of the true conductivity $\sigma_t$ of an earth formation.

6. Apparatus for processing well logging signals derived from an exploring means in a borehole, comprising:
   input means adapted to receive a well logging signal;
   converting means for converting said well logging signal to a first output signal which varies substantially as a logarithmic function of said well logging signal;
   means coupled to said input means for adding a predetermined fraction of said well logging signal to said first output signal to produce a second output signal which is representative of a given characteristic of an earth formation; and
   means responsive to said output signal attaining a given threshold level for causing said converting means to vary said output signal as a substantially linear function of said well logging signal.

7. Apparatus for processing well logging signals derived from an induction logging type of exploring means in a borehole, comprising:
   input means adapted to receive a well logging signal representative of the conductivity of a formation adjacent a borehole;
   converting means, including an amplifier with a logarithmic element in a feedback path of said amplifier, for converting said well logging signal to a logarithmic signal which varies substantially as a logarithmic function of said well logging signal;
   means coupled to said input means for adding a predetermined fraction of said well logging signal to said logarithmic signal to produce an output signal which is representative of the true conductivity of an earth formation; and
   means responsive to said output signal attaining a given threshold level for switching a resistor into a feedback path from the output of said adding means to the input of said converting means so that said output signal will vary as a substantially linear function of said well logging signal after said threshold level has been attained.

8. Apparatus for processing well logging signals derived from an exploring means in a borehole, comprising:
   input means adapted to receive a well logging signal;
   converting means for converting said well logging signal to an output signal which varies substantially as a logarithmic function of said well logging signal;
   means responsive to said output signal attaining a given threshold level for causing said converting means to vary said output signal as another function of said well logging signal;
   antilogarithmic converting means for converting said output signal to an inverse function of said well logging signal to be recorded by an indicating means;

means responsive to the amplitude of said inverse function signal for producing a control signal representative of whether said amplitude exceeds a given threshold level; and gain switching means responsive to said control signal for controlling the resolution with which said inverse function signal is recorded.

9. Apparatus for processing well logging signals derived from an exploring means in a borehole, comprising:

input means adapted to receive well logging signals representative of the conductivity and acoustic travel time of a formation adjacent a borehole;

converting means for converting said conductivity signal to a first output signal which varies substantially as a logarithmic function of said well logging signal;

means responsive to said first output signal attaining a given threshold level for causing said converting means to vary said first output signal as a substantially linear function of said well logging signal;

means responsive to said acoustic travel time signal for producing a second output signal representative of a logarithmic function of the porosity of a formation; and means for combining said first and second output signals to produce a signal representative of the apparent formation water resistivity.

10. Apparatus for processing well logging signals derived from an exploring means in a borehole, comprising:

input means adapted to receive well logging signals representative to the conductivity and acoustic travel time of a formation adjacent a borehole;

means for converting said conductivity signal to a logarithmic signal which varies substantially as a logarithmic function of said well logging signal;

means coupled to said input means for adding a predetermined fraction of said conductivity signal to said logarithmic signal to produce a first output signal which is representative of the true conductivity of an earth formation;

means responsive to said acoustic travel time signal for producing a second output signal representative of a logarithmic function of the porosity of a formation; and means for combining said first and second output signals to produce a signal representative of the apparent formation water resistivity.

11. A method of processing well logging signals derived from an induction logging type of exploring means in a borehole, comprising:

receiving a well logging signal representative of the conductivity of a formation adjacent a borehole;

converting said well logging signal to a logarithmic signal which varies substantially as a logarithmic function of said well logging signal; and adding a predetermined fraction of said received well logging signal to said logarithmic signal to produce an output signal which is representative of the true conductivity of an earth formation.